US009612339B2

(12) United States Patent
Nayyar et al.

(10) Patent No.: US 9,612,339 B2
(45) Date of Patent: Apr. 4, 2017

(54) DETECTING SATELLITE SIGNALS BY STORING SIGNAL SETS SPANNING CODE PERIOD

(75) Inventors: Jasbir Singh Nayyar, PPunjab (IN);
Jawaharlal Tangudu, Bangalore (IN);
Aravind Ganesan, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 839 days.

(21) Appl. No.: 13/412,281

(22) Filed: Mar. 5, 2012

(65) Prior Publication Data

US 2013/0229305 A1  Sep. 5, 2013

(51) Int. Cl.
G01S 19/29  (2010.01)
G01S 19/30  (2010.01)

(52) U.S. Cl.
CPC .............. *G01S 19/29* (2013.01); *G01S 19/30* (2013.01)

(58) Field of Classification Search
CPC .................................. G01S 19/29; G01S 19/30
See application file for complete search history.

(56) References Cited

U.S. PATENT DOCUMENTS

| 2003/0081660 A1* | 5/2003 | King et al. ..................... 375/150 |
| 2005/0151684 A1* | 7/2005 | Hsu ........................... 342/357.12 |
| 2007/0080856 A1* | 4/2007 | Camp ........................ 342/357.12 |
| 2011/0007783 A1* | 1/2011 | Weill ............................ 375/150 |

FOREIGN PATENT DOCUMENTS

| CN | 1543714 A | 11/2004 |
| CN | 101952735 A | 1/2011 |
| TW | 200516874 A | 5/2005 |

OTHER PUBLICATIONS

Circular buffer. (1998). In Dictionary of communications technology: Terms, definitions and abbreviations, Wiley. Retrieved from http://search.credoreference.com/content/entry/wileycommtech/circular_buffer/0.*
Circular buffer. (2000). In FOLDOC: Free On-Line Dictionary of Computing. Retrieved from http://foldoc.org/circular+buffer.*

(Continued)

Primary Examiner — Bernarr Gregory
Assistant Examiner — Fred H Mull
(74) Attorney, Agent, or Firm — Lawrence J. Bassuk; Charles A. Brill; Frank D. Cimino

(57) ABSTRACT

A GNSS receiver configured to detect a presence of at least one GNSS satellite signal in a received signal is provided. The GNSS receiver includes a buffer loaded with sample sets corresponding to the received signal and a Doppler derotation block configured to perform a Doppler derotation corresponding to at least one Doppler frequency on a sample set received from the buffer. The GNSS receiver further includes an accumulator block configured to perform a coherent accumulation of a plurality of sample sets upon or subsequent to the Doppler derotation corresponding to a Doppler frequency, and, a first memory configured to store the results of the coherent accumulation. A register array is configured to be loaded with the results stored in the first memory and a correlator engine is configured to generate correlation results by correlating the results in the register array with a plurality of code phases of GNSS satellites.

22 Claims, 6 Drawing Sheets

(56) References Cited

OTHER PUBLICATIONS

Buffer. (2001). In Hargrave's communications dictionary, Wiley. Retrieved from http://search.credoreference.com/content/entry/hargravecomms/buffer/0.*

Register. (2001). In Hargrave's communications dictionary, Wiley. Retrieved from http://search.credoreference.com/content/entry/hargravecomms/register/0.*

Facilitate. (2011). In the American Heritage dictionary of the English language. Retrieved from http://search.credoreference.com/content/entry/hmdictenglang/facilitate/0.*

Analog-To-Digital converter. (2001). In F. Hargrave, Hargrave's communications dictionary. Hoboken, NJ: Wiley. Retrieved from http://search.credoreference.com/content/entry/hargravecomms/analog_to_digital_converter/0.*

Quantization level. (2001). In F. Hargrave, Hargrave's communications dictionary. Hoboken, NJ: Wiley. Retrieved from http://search.credoreference.com/content/entry/hargravecomms/quantization_level/0.*

Quantization. (2006). In High definition: A-Z Guide to personal technology. Boston, MA: Houghton Mifflin. Retrieved from http://search.credoreference.com/content/entry/hmhighdef/quantization/0.*

S. Soliman et al., GPS receiver sensitivity enhancement in wireless applications, IEEE MTT-S Symposium on Technologies for Wireless Applications, p. 181-186, 1999. Digest, 1999.*

* cited by examiner

DETECTING SATELLITE SIGNALS BY STORING SIGNAL SETS SPANNING CODE PERIOD

TECHNICAL FIELD

Embodiments of the disclosure relates to detecting satellite signals.

BACKGROUND

Global navigation satellite systems (GNSS) may be broadly defined to include GPS (U.S.), Galileo (proposed), GLONASS (Russia), Beidou (China), IRNSS (India, proposed), QZSS (Japan, proposed) and other current and future positioning technologies using signals from satellites, with or without augmentation from terrestrial sources. Information from GNSS may be increasingly used for computing a user's positional information (e.g., a location, a speed, a direction of travel, etc.).

Pursuant to an exemplary scenario, in GNSS, multiple satellites may be present, with each transmitting a GNSS satellite signal. A received signal at a GNSS receiver contains one or more of the transmitted GNSS satellite signals. In order to obtain the information from the respective transmitted signals, the GNSS receiver performs a signal acquisition/tracking procedure. More specifically, the GNSS receiver searches for the corresponding transmitted signals in the received signal and then locks onto them so as to subsequently track the corresponding satellites to receive the satellite information.

Furthermore, in accordance with one exemplary scenario, the signal acquisition/tracking procedure may entail correlating the received signal (which may be, for example, down-converted to baseband) with a local signal generated within the GNSS receiver for various estimates of Doppler frequencies. The correlation results are coherently and non-coherently accumulated for detecting and acquiring satellite signals. The memory/area requirement associated with such accumulation increases sizably with an increase in the number of searches (Doppler/GNSS satellite combinations) performed during correlation.

SUMMARY

A number of exemplary GNSS receivers configured to detect a presence of one or more GNSS satellite signals in a received signal are provided. In an example embodiment, the GNSS receiver includes a buffer, a Doppler derotation block, an accumulator block, a first memory, a register array and a correlator engine. The buffer is configured to be loaded with sample sets corresponding to a received signal. In some embodiments, the buffer is configured to be cyclically loaded with sample sets comprising one millisecond (ms) worth samples corresponding to the received signal. In some embodiments, the number of sample sets stored in the buffer is greater than a maximum pre-determined coherent accumulation period. For example, if the maximum pre-determined coherent accumulation period is 19 ms, then the buffer is configured to store twenty sample sets. The Doppler derotation block is configured to receive a sample set from among the sample sets loaded in the buffer and perform a Doppler derotation based on one or more Doppler frequencies on the sample set.

In some embodiments, the accumulator block is configured to perform coherent accumulation of a plurality of sample sets upon or subsequent to Doppler derotation corresponding to a Doppler frequency and store the results of coherent accumulation in the first memory. In some embodiments, the coherent accumulation is performed based on a pre-determined coherent accumulation period. Examples of the pre-determined coherent accumulation period may include, but are not limited to, one of a 1 ms time period, 5 ms time period, a 11 ms time period and a 19 ms time period. In some embodiments, the register array is configured to be loaded with the results stored in the first memory and the correlator engine is configured to facilitate a search of GNSS satellite signals in the received signal by generating correlation results by correlating the results loaded in the register array with a plurality of code phases of GNSS satellites. In certain embodiments, a GNSS receiver includes a control sequencing block configured to schedule a sequence of searches for GNSS satellite signals by scheduling an order of Doppler frequencies configured to perform a Doppler derotation and an order of a plurality of code phases of the GNSS satellites for performing correlation.

In some embodiments, scheduling the sequence comprises allocating a start timing reference for each search for a GNSS satellite signal. The start timing reference may be allocated based on a load status associated with a number of searches for GNSS satellite signals in the received signal. In an example embodiment, the start timing reference is allocated based on a least load status associated with a number of searches for GNSS satellite signals in the received signal. Upon allocating the start timing reference, each search for GNSS satellite signals in the received signal is performed based on the allocated start timing reference and the pre-determined coherent accumulation period.

In some embodiments, the register array is configured to be loaded with the sample set upon or subsequent to a Doppler derotation corresponding to a Doppler frequency, and the correlator engine is configured to facilitate a search of GNSS satellite signals by generating correlation results by correlating the sample set loaded in the register array with a plurality of code phases of a GNSS satellite. The accumulator block is configured to perform coherent accumulation of correlation results corresponding to a plurality of sample sets and the plurality of code phases of the GNSS satellite, and store the results of coherent accumulation in the first memory. The coherent accumulation is performed based on a pre-determined coherent accumulation period.

Methods for detecting a GNSS satellite signal in a received signal are also provided. In certain embodiments, a method includes performing a Doppler derotation corresponding to a Doppler frequency on a plurality of sample sets corresponding to a received signal and performing a coherent accumulation of the plurality of sample sets upon or subsequent to the Doppler derotation corresponding to the Doppler frequency. The coherent accumulation is performed based on a pre-determined coherent accumulation period. The method further includes facilitating a search of GNSS satellite signals in the received signal by correlating the results of the coherent accumulation of the plurality of sample sets with a plurality of code phases of GNSS satellites.

DETAILED DESCRIPTION

Pursuant to an exemplary scenario, signal acquisition/tracking components in a GNSS receiver consume sizable area and power. Various embodiments of the present technology, however, provide systems and methods for detecting satellite signals that are capable of overcoming these and other obstacles and providing additional benefits.

The following description and accompanying figures demonstrate that the present technology may be practiced or otherwise implemented in a variety of different embodiments. It should be noted, however, that the scope of the present technology is not limited to any or all of the embodiments disclosed herein. Indeed, one or more of the devices, features, operations, processes, characteristics, or other qualities of a disclosed embodiment may be removed, replaced, supplemented, or changed.

The following description and accompanying figures demonstrate that the present disclosure may be practiced or otherwise implemented in a variety of different embodiments. It is noted, however, that the scope of the present disclosure is not limited to any or all of the specifically disclosed embodiments. Indeed, one or more of the devices, features, operations, processes, characteristics, or other qualities of a specifically disclosed embodiment may be removed, replaced, added to, or changed without exceeding the scope of the present disclosure.

Figure 1:
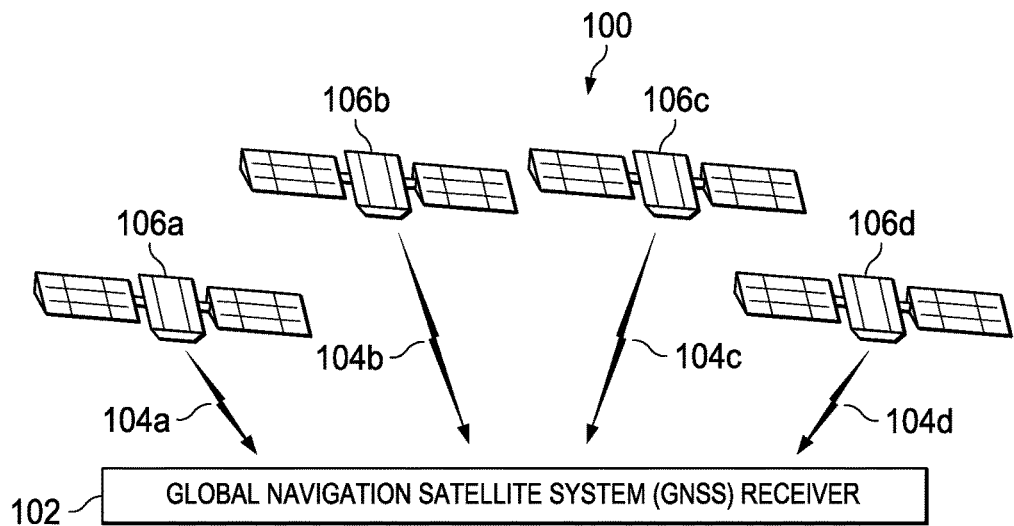
FIG. 1 is a network diagram depicting global navigation satellite system (GNSS) satellites and a GNSS receiver.

FIG. 1 is a network diagram 100 depicting global navigation satellite system (GNSS) satellites and a GNSS receiver. The network diagram 100 depicts a GNSS receiver 102 that is configured to receive satellite signals from a plurality of GNSS satellites. For instance, the GNSS receiver 102 may receive a satellite signal 104a from a GNSS satellite 106a, a satellite signal 104b from a GNSS satellite 106b, a satellite signal 104c from a GNSS satellite 106c and a satellite signal 104d from a GNSS satellite 106d. The plurality of GNSS satellites may hereinafter be collectively referred to as 'GNSS satellites' and the satellite signals, such as satellite signal 104a, 104b, 104c and 104d, may be hereinafter collectively referred to as GNSS satellite signals. The GNSS satellites may be man-made earth orbiting devices used for receiving and/or transmitting signals, which may include global positioning satellite signals, through transponders of the respective man-made earth-orbiting devices. Though FIG. 1 depicts the GNSS receiver 102 as receiving the GNSS satellite signals from four GNSS satellites, the GNSS receiver 102 may receive GNSS satellite signals from more or less satellites and/or from multiple satellites belonging to multiple satellite systems, such as a global positioning system (GPS), a Global'naya Navigatsionnaya Sputnikovaya Sistema (GLONASS) satellite system, a Galileo satellite system and the like, and which are commonly referred to as GNSS.

A received signal at the GNSS receiver 102 may contain multiple transmitted GNSS satellite signals. In order to obtain the information from the respective transmitted GNSS satellite signals, the GNSS receiver 102 may perform a signal acquisition/tracking procedure. More specifically, the GNSS receiver 102 may search for the corresponding transmitted GNSS satellite signal in the received signal. The search may be performed based, for example, on a Pseudo-random Number (PN) code that is unique to each GNSS satellite. For example, in GPS, each GNSS satellite may repeatedly transmit a unique, 1023 bit PN code, wherein each transmission has duration of approximately 1 millisecond (ms). The GNSS satellites may also transmit a data bit every 20 ms by modulating (e.g., multiplying by +1/−1) the 20 consecutive PN codes. The GNSS receiver 102 may generate local signals (e.g., at baseband) and modulate each local signal with the unique code corresponding to each GNSS satellite so as to produce replica local signals. The received signal may then be correlated, e.g., matched, with the replica local signals so as to detect a presence of corresponding GNSS satellite signals in the received signal. Upon detecting a presence of a particular GNSS satellite signal (e.g., GNSS satellite signal 104a), the GNSS receiver 102 may lock onto the GNSS satellite signal so as to subsequently track of the corresponding GNSS satellite (e.g., GNSS satellite 106a) in order to receive satellite information. After locking onto or acquiring a minimum of four GNSS satellites, the GNSS receiver 102 may compute a user position by triangulation. The computation of the user position may be computed by a variety of techniques, such as, for example by using a Kalman filter, which is not discussed herein for the sake of brevity.

Figure 2:
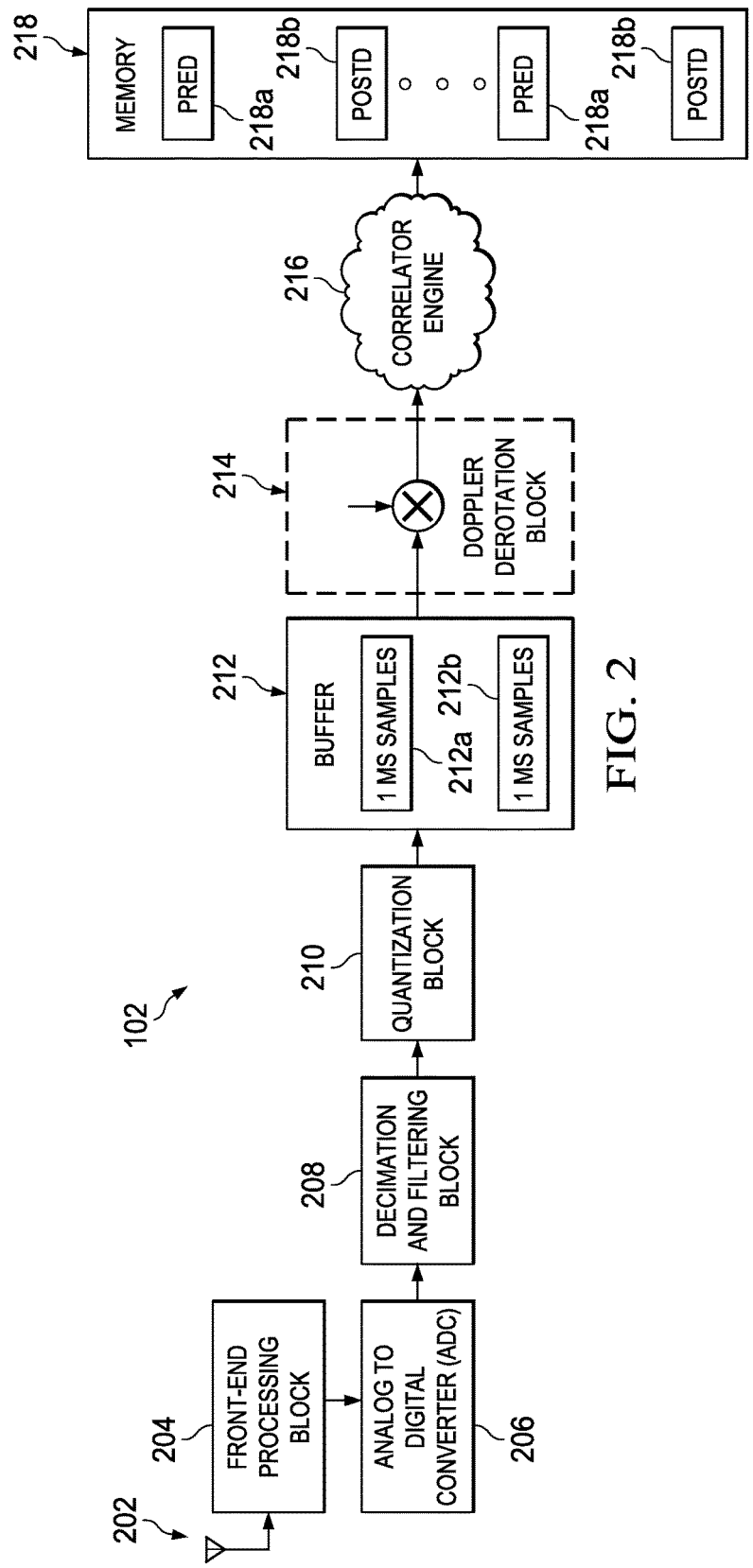
FIG. 2 is a simplified block diagram of a GNSS receiver.

FIG. 2 is a simplified block diagram of a GNSS receiver 102. As depicted, the GNSS receiver 102 includes an antenna 202, a front-end processing block 204, an analog-to-digital converter (ADC) 206, a decimation and filtering block 208, a quantization block 210, a buffer 212, a Doppler derotation block 214, a correlator engine 216 and a memory 218. The details of the diagram are provided merely by way of illustration, and other embodiments may contain fewer or more components and corresponding interconnections.

The antenna 202 is configured to receive multiple satellite signals from GNSS satellites (not shown) in one or more satellite systems, such as GPS, GLONASS, Galileo and the like. The combination of all satellite signals may be referred to as "received signal" or "signal." The antenna 202 is further configured to provide the signal to the front-end processing block 204. The front-end processing block 204 is configured to perform one or more levels of down-conversion so as to lower a carrier frequency of the signal to a lower frequency (e.g., an intermediate frequency (IF)). Additionally, the front-end processing block 204 may be configured to perform various front-end analog signal-processing operations on the signal, such as band-pass filtering, amplification using a low-noise amplifier, etc. The front-end processing block 204 is also configured to provide the processed signal (e.g., an IF signal) to the ADC 206. In certain embodiments, the front-end processing block 204 is designed to operate in GPS, Galileo, or similar environments using code division multiple access (CDMA) processes. The front-end processing block 204 may also be designed to operate in other environments, such as a GLONASS environment, using frequency division multiplexed (FDM) processes.

The ADC 206 is configured to sample the signal so as to generate a plurality of corresponding digital codes/samples. The sampling rate may be selected to be sufficiently high such that code and data information in the IF signal is preserved. The ADC 206 is configured to provide the plurality of samples corresponding to the signal to the decimation and filtering block 208. The decimation and filtering block 208 is configured to down-convert the IF frequency to baseband and provide the final down-converted signal at baseband to the quantization block 210. The quantization block 210 is configured to perform a multiple level quantization of the plurality of samples. The multiple level of quantization of the plurality of samples may associate each sample with the sample bit representation. For example, the quantization block 210 may be configured to perform a seven level quantization of the samples. The seven level quantization of the samples may associate each sample with a three bit representation.

The quantization block 210 is configured to provide the samples to the buffer 212. The GNSS receiver 102 of FIG. 2 is depicted to include a single buffer merely by way of illustration; however the GNSS receiver 102 may contain fewer or more buffers and corresponding interconnections. The buffer 212 is configured to store the samples corresponding to the signal (down-converted to baseband). The plurality of samples may be stored at a frequency of "S" samples per chip (spc), such as, for example, 1 spc, 2 spc and/or 4 spc. In an example embodiment, the buffer 212 is configured to store samples in the form of sample sets, for example sample set 212a and sample set 212b, with each sample set including a number of samples spanning at least one code period. In an example embodiment, when the GNSS satellite signal is from either a GPS satellite or a GLONASS satellite, the code period may correspond to a 1 ms time period. The 1 ms time period in GPS may correspond to a unique, 1023 bit code that is specific to each GPS satellite (not shown). An example of the buffer 212 may be a ping-pong buffer. Accordingly, one section (for example, a ping section) of the ping-pong buffer may be configured to store sample sets while the sample sets in another section (for example, the pong section) are forwarded to the Doppler derotation block 214. Thereafter, the stored sample sets from the ping section may be forwarded to the Doppler derotation block 214 while samples from the quantization block 210 are loaded into the pong section of the buffer 212 to form sample sets.

The Doppler derotation block 214 may be configured to perform Doppler derotation corresponding to one or more Doppler frequencies on the sample sets received from the buffer 212. For a variety of reasons, such as relative motion of the GNSS satellites and the user, receiver clock offset and the like, there may be a Doppler shift in the frequency "f" of the received signal. Several such estimates of the Doppler frequency (e.g., Doppler shift in the frequency) may be considered. The sample set may be multiplied by a complex sinusoid corresponding to a negative Doppler frequency in order to perform the Doppler derotation and remove the impact of the carrier Doppler shift in the signal.

The correlator engine 216 is configured to generate correlation results by generating replica local signals corresponding to each transmitted GNSS satellite signal (signals at baseband modulated by unique PN code corresponding to the each GNSS satellite), and correlating the Doppler derotated sample sets with each replica local signal so as to acquire (or lock onto) and track (or maintain a lock on) the transmitted GNSS satellite signals. A coherent accumulation and a non-coherent accumulation are performed on the correlation results and the results are stored in memory 218. The memory slots in the memory 218, including the results of the coherent accumulation and the non-coherent accumulation are referred to as Pred memory and Postd memory (depicted as memory slots 218a and 218b), respectively. A presence of a GNSS satellite signal in the received signal is detected based on the coherent accumulation and the non-coherent accumulation of the correlation results.

The coherent accumulation and the non-coherent accumulation are performed for each search of a Doppler-GNSS satellite combination, which may be referred to as a logical channel. For example, if 10 logical channels (10 different combinations of Doppler frequencies and GNSS satellites) are being searched, then the memory 218 would include 10 buffers for coherent accumulation and 10 buffers for non-coherent accumulation of the correlation results (one buffer each for coherent and non-coherent accumulation corresponding to each of the logical channels). In an example embodiment, if the sampling rate is 2 spc for a GPS system, then each sample set includes 2046 samples. Accordingly, 2046 correlation outputs may be generated and each of the Pred memory and the Postd memory may be configured to store 2046 correlation results corresponding to the sample set. As a number of logical channels increase, the number of buffers that are to be included in the memory 218 also increases, thereby increasing area and power consumption in the GNSS receiver 102. A GNSS receiver 102 with reduced area/power consumption is explained in conjunction with FIG. 3, in accordance with an embodiment.

Figure 3:
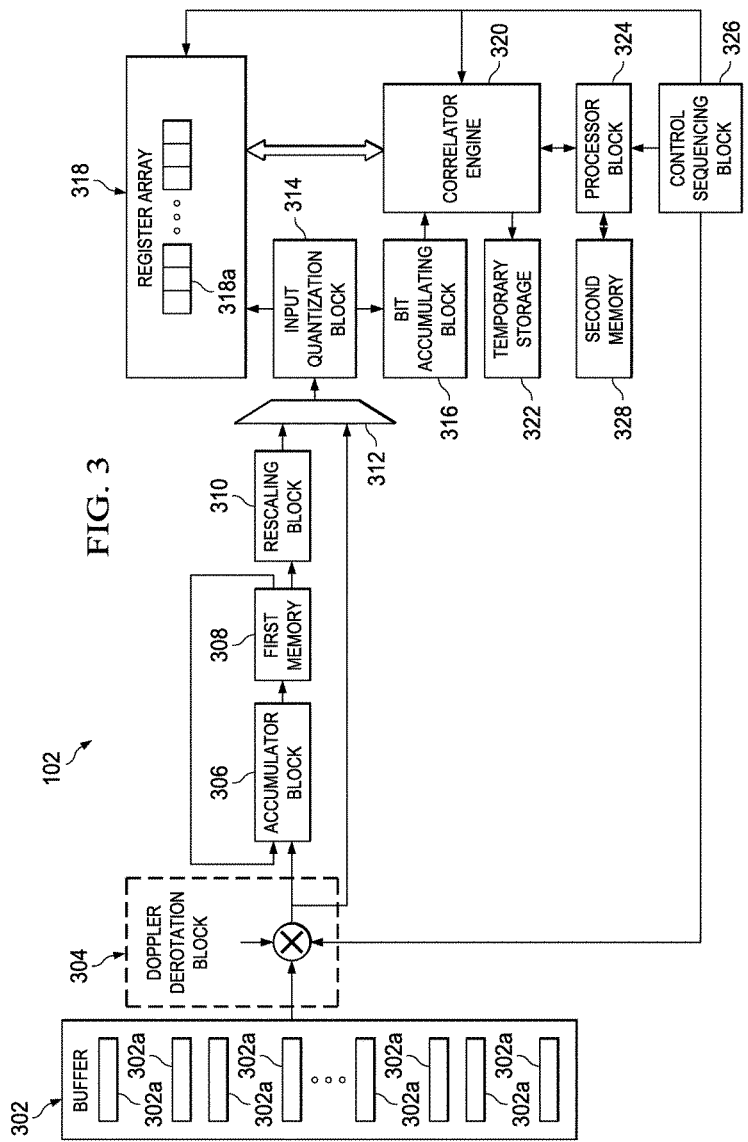
FIG. 3 is a block diagram illustrating a portion of a GNSS receiver configured to detect a presence of GNSS satellite signals in a received signal according to an embodiment.

FIG. 3 is a block diagram illustrating a portion of a GNSS receiver 102 configured to detect a presence of GNSS satellite signals in a received signal according to an embodiment. More particularly, the GNSS receiver 102 of FIG. 3 includes a buffer 302, a Doppler derotation block 304, an accumulator block 306, a first memory 308, a resealing block 310, a multiplexer 312, an input quantization block 314, a bit accumulating block 316, a register array 318, a correlator engine 320, a temporary storage 322, a processor block 324, a control sequencing block 326 and a second memory 328. The details of the portion of the GNSS receiver 102 are provided merely by way of illustration, and other embodiments may contain fewer or more components and corresponding interconnections.

The buffer 302 is configured to receive sample sets, such as, for example sample set 302a, corresponding to the signal from a quantization block, such as the quantization block 210 of FIG. 2, and store the sample sets corresponding to the signal. In an example embodiment, the buffer 302 is configured to store a number of sample sets, wherein each sample set includes a number of samples spanning at least one code period. In an example embodiment, when the GNSS satellite signal is from either a GPS satellite or a GLONASS satellite, the code period may correspond to a 1 millisecond (ms) time period. The 1 ms time period in GPS may correspond to a unique, 1023 bit code that is specific to each GPS satellite. At 1 spc, 1023 samples may be generated that correspond to the code period of 1 ms. Also, each sample may be embodied by 3 bit I and Q values for a total of 6 bits. Accordingly, one sample set of samples may include 1023×6 bits.

In an embodiment, the buffer 302 is configured to store GPS samples at 2 spc. At 2 spc, a sample set includes 2046 samples corresponding to the code period of 1 ms. The 2046 samples may be split into 1023 odd samples and 1023 even samples. Each sample may be depicted by 3 bit I and Q values for a total of 6 bits. Accordingly, one code period of odd samples may include 1023×6 bits and one code period of even samples may include 1023×6 bits. The buffer 302 may be configured to store such odd and even 1 ms samples.

It is noted that GPS 1 spc sample sets and GPS 2 spc sample sets do not limit the scope of the present disclosure. It should also be appreciated that the buffer 302 may not be restricted to GPS sample sets, but that it may also include sample sets corresponding to GNSS satellites belonging to other satellite systems, such as GLONASS (e.g., using a 511 bit PN-code). Furthermore, it is noted that the 1 spc and 2 spc rates are depicted for illustration purposes, and that they do not limit the scope of the present disclosure. Also, the buffer 302 may include sample sets including samples that are sampled at smaller or larger number of samples per chip. For example, the buffer 302 may store samples that are sampled at 4 spc, 6 spc and so on.

In an example embodiment, the buffer 302 is a configured to store at least a number of sample sets corresponding to a maximum pre-determined coherent accumulation period. In an embodiment, the maximum pre-determined coherent accumulation period is nineteen and the buffer 302 is configured to store 20 sample sets, such as, for example, 20 one ms samples. However, the number of 1 ms worth samples stored in the buffer 302 may vary and might not be restricted to the example provided.

In an example embodiment, the buffer 302 is configured to be a cyclical buffer. Accordingly, the buffer 302 may be configured to be cyclically loaded and store the 20 sample sets based on a first in first out (FIFO) principal. More specifically, the latest sample set provided by quantization block may replace the earliest sample set stored in the buffer 302. In an embodiment, when a sample set is being loaded into the buffer 302, the remaining sample sets in the buffer 302 may be available for further processing. For example, if the $20^{th}$ sample set is being loaded into the buffer 302, the remaining 19 sample sets (sample sets 1 to 19) may be available for further processing. When the next 1 ms sample set is being loaded into the buffer 302, then sample sets 2 to 20 may be available for processing (e.g., made available to be provided to the Doppler derotation block 304).

In an example embodiment, a sample set stored in the buffer 302 may be provided to the Doppler derotation block 304 in an on-going manner. In an example embodiment, the buffer 302 may cyclically provide sample sets to the Doppler derotation block 304. The Doppler derotation block 304 is configured to perform Doppler derotation corresponding to at least one Doppler frequency on the sample sets. As explained in FIG. 2, due to reasons such as relative motion of the GNSS satellites and the user or a receiver clock offset, there may be a Doppler shift in the frequency "f" of the received signal. Several such estimates of the Doppler frequency (e.g., a Doppler shift in the frequency) may be considered. In an example embodiment, the Doppler derotation block 304 may be configured with a carrier phase generator utilizing a phase accumulator (not shown) to generate negative Doppler coefficients or negative Doppler frequency corresponding to each Doppler frequency. The sample sets may be multiplied by a complex sinusoid corresponding to the negative Doppler frequency to perform the Doppler derotation and remove the impact of the carrier Doppler shift in the signal.

A plurality of sample sets may be coherently accumulated by the accumulator block 306 upon or subsequent to Doppler derotation corresponding to a Doppler frequency from among the Doppler frequencies. In some embodiments, the coherent accumulation of the plurality of sample sets may be performed based on a pre-determined coherent accumulation period. In an example embodiment, the pre-determined coherent accumulation period is one of a 1 ms time period, 5 ms time period, 11 ms time period, and 19 ms time period. Furthermore, it is noted that the 1 ms, 5 ms, 11 ms, and 19 ms time period rates are provided for exemplary purposes only and that they do not limit the scope of the present disclosure. Also, the pre-determined coherent accumulation period may include time period other than a 1 ms, 5 ms, 11 ms, or 19 ms time period. The coherent accumulation of the Doppler derotated plurality of sample sets may include summing the sample sets based on the pre-determined coherent accumulation period. The coherent accumulation may also include integrating I and Q components of the received signal separately. The coherent accumulation of the plurality of sample sets is explained in further detail in FIG. 4.

Figure 4:
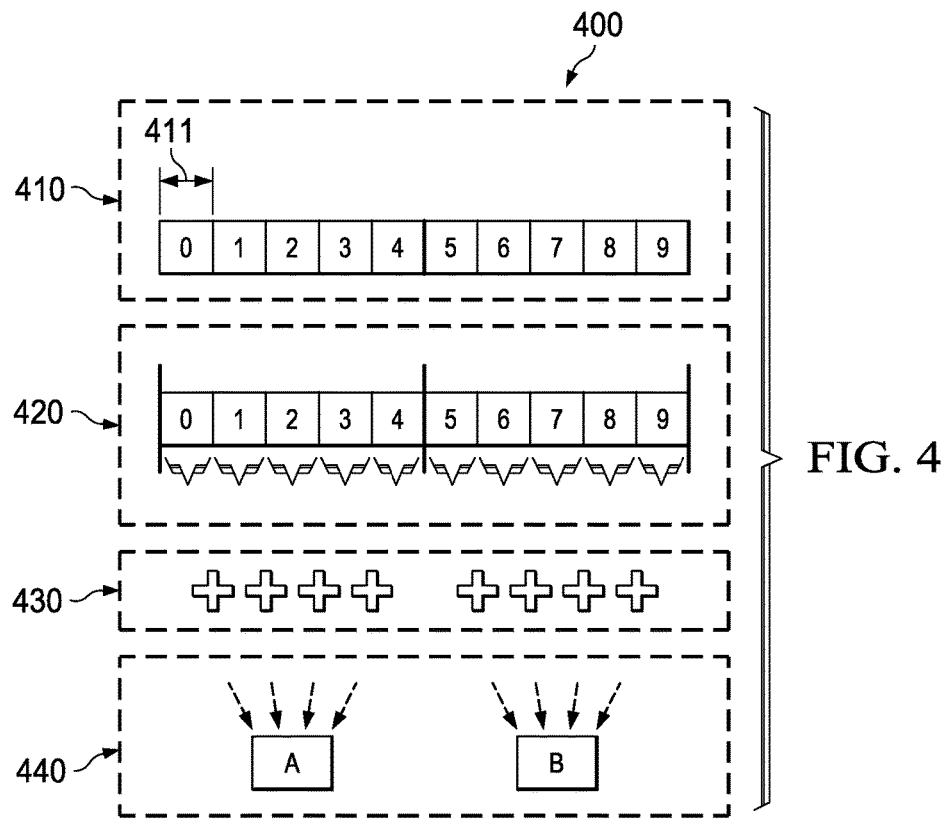
FIG. 4 is a schematic diagram depicting a coherent accumulation of a plurality of sample sets upon or subsequent to a Doppler derotation corresponding to a Doppler frequency according to an embodiment.

Referring now to FIG. 4, a schematic diagram depicts a coherent accumulation 400 of a plurality of sample sets upon or subsequent to Doppler derotation corresponding to a Doppler frequency according to an embodiment. In particular, sample sets are loaded in a buffer, such as buffer 302, at 410. Additionally, these sample sets are shown upon or subsequent to Doppler derotation, corresponding to a Doppler frequency, at 420. Furthermore, a coherent accumulation 430 of the sample sets is performed, such as for example by accumulator block 306, and the results of the coherent accumulation 430 of the sample sets are stored in memory, such as for example the first memory 308, at 440.

To further illustrate, a plurality of sample sets, such as, for example ten sample sets from sample set 0 to sample set 9 (shown as 0 to 9 in FIG. 4) may be cyclically loaded in the buffer 302, wherein each sample set includes samples having a code period, such as exemplary code period 411 (for example, a 1 ms code period). In an embodiment, each sample set may include 1023 samples corresponding to a 1 ms code period of GPS at 1 spc. In an embodiment, each sample set may include 2046 samples corresponding to a 1 ms code period of GPS at 2 spc. In some embodiments, the sample sets may similarly include samples corresponding to GLONASS, Galileo or any such GNSS at larger or smaller spc sampling rates.

In an embodiment, the pre-determined coherent accumulation period is selected as a 5 ms time period. The pre-determination of coherent accumulation period may be performed automatically or manually based on a variety of factors, such as currently available information regarding the positional information, etc., and is not discussed herein. The pre-determined coherent accumulation period of a 5 ms time period is selected in FIG. 4 for exemplary purposes and the pre-determined coherent accumulation period may be chosen to be larger or smaller than 5 ms time period.

Since the coherent accumulation period is selected to be a 5 ms time period, upon or subsequent to completion of the loading of sample sets from 0 to 4 (e.g., 5 ms worth sample sets), further processing is initiated. Accordingly, when the $6^{th}$ sample set (sample set 5) is being cyclically loaded into the buffer 302, the first five sample sets (sample set 0 to sample set 4) are provided to the Doppler derotation block 304, one after another, and the Doppler derotation block 304 is configured to perform a Doppler derotation corresponding to a Doppler frequency (e.g., the first Doppler frequency). Upon or subsequent to performing Doppler derotation corresponding to the first Doppler frequency, sample set 0 may be provided to the accumulator block 306 which may store the Doppler derotated sample set in the first memory 308. Upon or subsequent to completion of the Doppler derotation corresponding to the first Doppler frequency, sample set 1 may be provided to the accumulator block 306, which may coherently add sample set 0 and sample set 1 and store the sum of coherent addition into the first memory 308. Similarly, sample sets 2, 3 and 4 upon or subsequent to Doppler derotation corresponding to the first Doppler frequency may be coherently added to the sum of coherent addition of previous sample sets and stored in the first memory 308. Such a coherent accumulation (e.g., coherent addition) of five 1 ms sample sets may generate a coherent accumulation result of one 1 ms sample set (depicted by sample set A in FIG. 4). Accordingly, the "results" of coherent accumulation of the plurality of sample sets is a sample set representing the sum of coherent addition of the plurality of sample sets. In some embodiments, for a pre-determined coherent accumulation period of an 11 ms time period (or a 19 ms time period), the result of the coherent accumulation of 11 (or 19) 1 ms sample sets may generate one sample set of 1 ms representing the sum of coherent addition of the 11 (or 19) 1 ms sample sets.

In FIG. 4, the processing of the next five sample sets, such as, for example, sample set 5 to sample set 9, may be initiated during the loading of sample set 10 (not shown in FIG. 4) in the buffer 302. The five 1 ms sample set may be forwarded to the Doppler derotation block 304 for Doppler derotation corresponding to the first (or second) Doppler frequency and to the accumulator block 306 for coherent accumulation to generate one 1 ms sample set (depicted by sample set B in FIG. 4).

Referring now to FIG. 3, the results of coherent accumulation (for example, sample set A) from the first memory 308 may be provided to the rescaling block 310 which may perform the necessary bit adjustments and provide the results to a multiplexer 312 which may provide the results to the input quantization block 314. The input quantization block 314 may perform a multiple level quantization of the results. The multiple level of quantization may associate each sample within the sample set with a sample bit representation. For example, the input quantization block 314 may be configured to perform a seven level quantization of the samples. The seven level of quantization may associate each sample with a three bit sample representation.

In an example embodiment, the quantization thresholds, the quantization levels and associated bit representations for the multiple level of quantization may be performed in a manner wherein a bit at a first position, such as, for example, the Least Significant bit (LSB) position, within each sample bit representation is configured to remain unaltered on correlation with a plurality of code phases of the GNSS satellites. As the LSB bit remains unaltered during the correlation process, the LSB bits may be accumulated and stored in the bit-accumulating block 316 prior to loading the results in the register array 318. Partial correlations may then be performed with two bits of the three bit sample representation and the LSB bits may thereafter be added to the result to generate the correlation results.

It is noted that the input quantization block 314 may perform quantization in a manner that is similar to that of the quantization block 210. The samples corresponding to the results (for example, samples in the sample set A) may need to be quantized again after the post Doppler derotation so as to maintain the sample bit representation of the samples intact for correlation purposes. Subsequent to the quantization, the results of the coherent accumulation of the plurality of sample sets are loaded in the register array 318. An example of the register array 318 may include, but is not limited to, a tapped delay line. In an example embodiment, the register array 318 includes locations, such as location 318a, which are configured to store a sample (e.g., sample bit representations corresponding to the sample) of the results.

Upon completion of correlation of the results (for example, sample set A) loaded in the register array 318 with a plurality of code phases of GNSS satellites, the register array 318 is configured to be reloaded with subsequent results of the coherent accumulation of the plurality of sample sets (for example, sample set B) after a pre-determined coherent accumulation period (for example, 5 ms), which may be Doppler derotated corresponding to the same Doppler frequency or the subsequent Doppler frequency.

For the results (e.g., samples corresponding to the result of coherent accumulation) in the register array 318, the correlator engine 320 is configured to generate correlation results by correlating the results with a plurality of code phases of GNSS satellites. More specifically, the correlator engine 320 may be configured to generate local signals corresponding to each transmitted GNSS signal and correlate the received signal with each of the local signals so as to acquire (or lock onto) and track (or to maintain a lock on) the transmitted GNSS signals. Each local signal may be a corresponding PN code generated, for example, by using a PN code generator (not shown), of a GNSS satellite. On correlating the results stored in the register array 318, the local signal may be cyclically shifted, such as, for example, by one bit (e.g., code phase), until all bits of the local signal are shifted and the correlation with the results stored in the register array 318 may be performed for each shifted version of the local signal.

In an example embodiment, the register array 318 is configured to be loaded with results including a number of samples spanning one code period. In an example embodiment, 1023 samples (e.g., three bit representations of 1023 samples) corresponding to the results are loaded into the register array 318 after correcting for a Doppler frequency, such as, for example, a first Doppler frequency. During the process of loading the samples in the register array 318, the correlator engine 320 may also generate a local signal which is a PN code corresponding to a GNSS satellite, such as, for example a first GNSS satellite. The correlator engine 320 may correlate the results with the local signal, such as, for example, by multiplying the samples within the results with +1/−1 values corresponding to the PN code, so as to generate a set of correlation results.

In cyclic convolution based correlation, the PN code may be shifted by one code phase (for example, one bit), and the correlation is performed again with the samples corresponding to the results that are kept static in the register array 318 so as to generate another set of correlation results. The PN code may be cyclically shifted by 1023 bits, one bit at a time, and a correlation may be performed with the samples corresponding to the results for each code phase so as to generate 1023 correlation results. The correlation results may be stored in the temporary storage 322. The correlation results stored in the temporary storage 322 may be processed and the temporary storage 322 may be emptied subsequently.

The correlation results may be similarly generated for multiple Doppler frequencies for a plurality of code phases for each GNSS satellite being searched and stored in the temporary storage 322, which may be emptied for storing the next set of correlation results. It is noted that the plurality of code phases is configured by cyclically shifting a GNSS satellite code corresponding to each GNSS satellite of the at least one GNSS satellite by at least one code phase. It is further noted that, for samples at 2 spc, after computing all of the correlations of odd samples, the 1023 input samples corresponding to the even samples may be loaded, and correlations may be computed and stored in a temporary storage 322.

In an example embodiment, the bit accumulating block 316 is configured to accumulate a bit at the first position within each sample representation corresponding to the samples in the results while loading the results in the register array 318. It is noted that each sample loaded in the register array 318 is represented by its entire sample bit representation (including the bit at the first position) and that the bit accumulating block 316 may be configured to record the bit at the first position for each sample. In an example embodiment, the first position corresponds to a least significant bit (LSB) position within each sample bit representation and the bit accumulating block 316 stores and accumulates the LSB bits of the sample bit representations while loading the results in the register array 318. The correlator engine 320 is configured to perform a partial correlation of the samples by correlating the remaining bits, (e.g., bits not at the LSB position or the most significant bits), with the plurality of code phases of the at least one GNSS satellite. The accumulated LSB bits may be added to the partial correlation results so as to generate the correlation results.

In an example embodiment, for a 2 spc sampling rate, correlation results for the even samples (0, 2, 4, 6, . . . ) are stored in the temporary storage 322 followed by the storage of the correlation results for the odd samples (1, 3, 5 . . . ). The correlation results may then be arranged in a natural order (0, 1, 2, 3 . . . ) and provided to the processor block 324. The processor block 324 is configured to perform a non-coherent accumulation of the correlation results. The second memory 328 is configured to store the non-coherent accumulation of the correlation results. The above sequence of steps may be repeated for a plurality of code phases for different GNSS satellites.

The processor block 324 is further configured to perform a timing offset correction on the correlation results prior to performing the non-coherent accumulation of the correlation results. Procedures for the timing offset correction may include but are not limited to procedures such as code Doppler correction, and are not discussed herein.

The second memory 328 is configured to store the non-coherent accumulation of the correlation results. It is noted that the second memory 328 may include a bank of non-coherent memories for the non-coherent accumulation of the correlation results. The non-coherent accumulation of the correlation results may be performed to improve a signal-to-noise ratio (SNR) of the received signal so as to detect the presence of the GNSS satellite signals in the received signal. The non-coherent accumulation may include techniques, such as accumulating absolute values of accumulated data from the coherent accumulation, accumulating squares of absolute values of accumulated data from the coherent accumulation and the like.

In an example embodiment, the processor block 324 is further configured to detect the presence of the at least one GNSS satellite signal based on the non-coherent accumulation of the correlation results. For example, the correlation results corresponding to each code phase search in 1 ms may be summed over 1 s (or such other programmed time duration) so as to identify a clear peak (for example by checking for crossing of pre-defined mathematical threshold functions and the like), which may signify the presence of GNSS satellite signal. The location of the peak may then be obtained by interpolation, and/or a number of known procedures, so as to obtain a distance between a GNSS satellite and the user.

In an example embodiment, the GNSS receiver 102 may be configured to operate in a non-upfront mode, wherein the coherent accumulation of the plurality of sample sets is not performed upfront and stored in the first memory 308 as explained above. In such a scenario, upon or subsequent to Doppler derotation corresponding to a Doppler frequency of a sample set received from the buffer 302, the sample set is selected by the multiplexer 312 and loaded in the register array 318, wherein the sample set bypasses the accumulator block 306, first memory 308 and the resealing block 310. The correlator engine 320 is configured to perform a correlation of the Doppler derotated sample set in the register array 318 with a plurality of code phases of GNSS satellites and store the correlation results in the temporary storage 322. The processor block 324 may then be configured to perform both the coherent and the non-coherent accumulation of the correlation results and store the accumulation results in the second memory 328. The presence of the GNSS satellite signal in the received signal is determined based on the coherent and non-coherent accumulation of the correlation results. The selection of the non-upfront mode by the GNSS receiver 102 may be performed in situations where prior information about the GNSS satellites to be searched is available thereby precluding a correlation of all code phases of a plurality of GNSS satellites so as to detect the presence of at least one GNSS satellite signal in the received signal. The multiplexer 312 may select the upfront coherent accumulation when prior information regarding the GNSS satellites to be searched is not available, thereby requiring a correlation of all code phases of a plurality of GNSS satellites. For example, if the GNSS receiver 102 is to compute correlation results for only 8 code phases instead of 1023 code phases, then the upfront mode is sub-optimal.

The control sequencing block 326 is configured to trigger/control a sequence of operations, such as, for example, scheduling an order of searching for the plurality of GNSS satellites, selecting the Doppler frequency configured to perform a Doppler derotation, (e.g., carrier Doppler removal), determining a coherent accumulation period for generating the results, loading the results into the register array 318 and selecting the GNSS satellite code for performing the correlation operation.

In an example embodiment, the control sequencing block 326 is configured to receive requests for searching for the presence of GNSS satellites signals asynchronously. Searching for the presence of the GNSS satellite signals includes searching for a combination of Doppler frequency and GNSS satellite code phases in the received signal (wherein each such combination may be referred to as a logical channel). Accordingly, the GNSS receiver 102 is configured to perform Doppler derotation of the sample sets corresponding to the received signal, and for each such Doppler derotation corresponding to a Doppler frequency, and correlation with a plurality of code phases of a plurality of GNSS satellites is performed so as to detect the presence of the a satellite signal in the received signal.

As explained above, the processing of the sample sets is initiated based on the pre-determined coherent accumulation period. For example, if the pre-determined coherent accumulation period for a particular logical channel (Doppler—satellite combination) search is 5 ms, then the processing of the sample sets will be initiated during the cyclical loading of the $5^{th}$ 1 ms sample set. The GNSS receiver 102 is idle during the loading of the first five 1 ms sample sets (for example sample set 0 to sample set 4). During the loading of the $5^{th}$ 1 ms sample set, the first five sample sets are provided to the Doppler derotation block 304, one after another, coherently accumulated by the accumulator block 306, wherein results of the coherent accumulation are stored in the first memory 308, results are loaded in the register array 318, correlated with the plurality of code phases of the GNSS satellite(s) and non-coherently accumulated by the processor block 324. Accordingly, the GNSS receiver 102 is idle for 5 ms, but in the next ms, it performs the entire processing of the five sample sets. A number of searches for GNSS satellites, therefore, may be initiated in parallel, and a capacity of the correlator engine 320 may be optimized. Accordingly, a search for a logical channel search may be initiated for sample sets 0 to 4, and, instead of waiting for next 5 ms, the second search for the GNSS satellite may be initiated for sample sets 1 to 5 when the $6^{th}$ 1 ms sample set is being loaded in the cyclical buffer. In an embodiment, the pre-determined coherent accumulation period for each logical channel search may be different. For example, the first logical channel search may be associated with a 5 ms pre-determined coherent accumulation period, whereas the subsequent logical channel search may be associated with a 11 ms pre-determined coherent accumulation period.

The control sequencing block 326 is configured to schedule a sequence of searching of logical channels for optimizing a processing load on the correlator engine 320. For example, during a one ms time period, the correlator engine 320 may be capable of performing a correlation of the results loaded in the register array 318 with the plurality of code phases for GNSS satellites corresponding to 40 logical channel searches (including the time involved in loading the sample sets in the buffer, performing a Doppler derotation of a plurality of sample sets, performing a coherent accumulation of the plurality of sample sets, loading the results of the coherent accumulation in the register array 318 and performing a correlation of the results); however, the control sequencing block 326 may receive logical channel search requests greater than 40 in number. The control sequencing block 326 may then stagger a starting time for each such search so as to maintain an optimum processing load on the correlator engine 320. The scheduling of the logical channel search requests may be performed for upfront mode operation of the GNSS receiver 102 and is explained in further detail in FIGS. 5A and 5B.

Figure 5A:
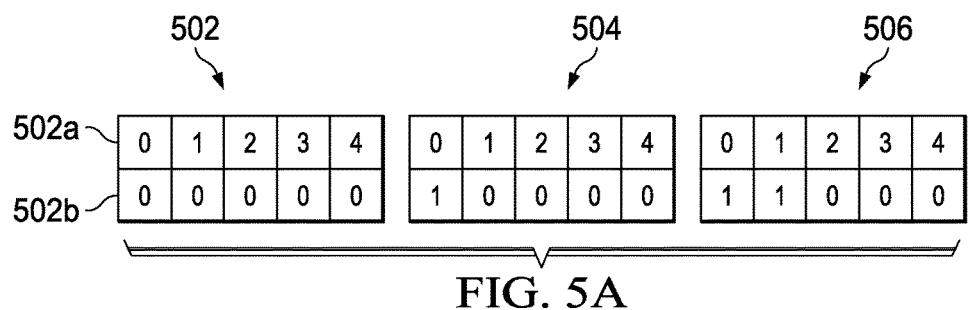
FIGS. 5A and 5B each illustrate a scheduling of searches for GNSS satellite signals according to an embodiment.
Figure 5B:
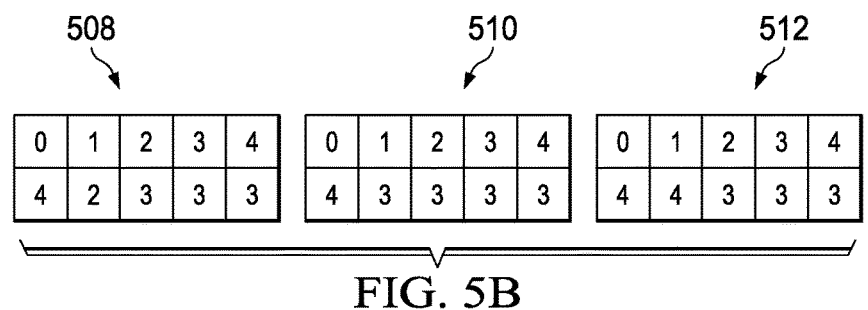

FIGS. 5A and 5B illustrate scheduling of searches for GNSS satellite signals, in accordance with an embodiment. As explained in FIG. 3, the control sequencing block 326 is configured to schedule an order of searching the logical channels in the received signal. More particularly, the control sequencing block 326 is configured to schedule a sequence of searches for GNSS satellite signals by scheduling an order of Doppler frequencies configured to perform a Doppler derotation and an order of a plurality of code phases of GNSS satellites for performing correlation.

The control sequencing block 326 may receive requests for searching logical channels in an asynchronous manner. The control sequencing block 326 may allocate a start timing reference for each such logical channel search. In an example embodiment, the start timing reference is allocated based on a load status associated with the number of searches for GNSS satellite signals in the received signal. The load status may be defined to be a number of logical channel search related correlations performed in pre-defined time duration. For example, if five GNSS satellite signal searches corresponding to five GNSS satellites are scheduled to be performed in a 1 ms time period (pre-defined time duration), then the load status for that 1 ms time period is five logical channel searches. In an example embodiment, the start timing reference is allocated based on a least load status associated with the number of searches for GNSS satellite signals in the received signal. For example, if five logical channel searches are scheduled in each of the first four 1 ms time slots and four logical channel searches are scheduled in the fifth 1 ms time slot, then a fresh search request for a GNSS satellite signal is scheduled for the fifth 1 ms time slot, since it is associated with the least load status among the load status associated with the number of searches for GNSS satellite signals in the received signal.

As explained above, the logical channel search requests may be received in an asynchronous manner. In an example embodiment, if the search request is received at f=100 (implying the logical channel search is received while the correlator engine 320 is processing logical channel searches allocated for the $100^{th}$ 1 ms time period), then the control sequencing block 326 checks the load status over a number of time slots (f>100) and provides a starting time reference based on a time slot of the correlator engine associated with the least load status. The execution of the correlation may then be performed based on the start timing reference and pre-defined coherent accumulation period associated with that particular logical channel search. In an example embodiment, the execution of the search is based according to the expression:

$$\mathrm{mod}(f, \text{Pred count}) = \mathrm{mod}(f_1, \text{Pred Count}) \text{ for all } f_1 > f$$
and Where f is the time slot associated with the start timing reference and Pred Count is the coherent accumulation period associated with the logical channel search. For example, if the start timing reference of a logical channel search is allocated to be at f=101 and the coherent accumulation period associated with the logical channel search is 5 (Pred Count is 5), then mod of (101, 5) is 1. For all f>101, the logical channel search will be start at f=101 and subsequently be executed in family of time slots corresponding to mod count of 1. Accordingly, the logical channel search will be executed in the family of time slots 101, 106, 111 and so on and so forth, until the logical channel search is completed.

In FIG. 5A, a block 502 depicts two rows, each including five slots, corresponding to five 1 ms time period. The upper row 502a represents a modulo count associated with a logical channel and the lower row 502b represents the load status for each of the five 1 ms time period. Initially, load status is depicted to be zero for each of the five 1 ms time slots. For the first logical channel search, the control sequencing block 326 may check the load status and allocate the start timing reference to a time slot associated with the lowest load status and the lowest index of modulo count. Accordingly, the starting time reference for the logical channel search may be allocated to the time slot corresponding to the 0 modulo count as the load status is the least and the time slot corresponds to the lowest index of modulo count. The allocation is depicted in block 504, wherein the time slot corresponding to the modulo count 0 has a load status of 1 corresponding to the first logical channel search. For a next logical channel search, the control sequencing block 326 again checks the load status of the time slots of the correlator engine 320 and selects the lowest value (value 0) of the load status and the lowest index of modulo count (value 1) among those with lowest value of load status and allocates the logical channel search to the family of time slots corresponding to the modulo count 1, as depicted by block 506. Another example of scheduling of logical channel searches is provided in FIG. 5B.

FIG. 5B illustrates another example of scheduling of logical channel searches as explained above. In block 508, the load status associated with modulo counts 0, 1, 2, 3 and 4 are depicted to be 4, 2, 3, 3 and 3, implying that there are 4 logical channel searches being performed in family of time slots associated with modulo count 0, two logical channel searches being performed in family of time slots associated with modulo count 1, and so on and so forth. For a new logical channel search, the control sequencing block 326 allocates the start timing reference to the time slot associated with modulo count 1, as the load status associated with those family slots is the lowest as compared to other family of slots. This scenario is depicted in block 510. The start timing reference for a next logical channel search will again be allocated to family of slots associated with modulo count 1 as it corresponds to the lowest value of load status and lowest index of modulo count as depicted in block 512 with the corresponding load status of (4, 4, 3, 3 and 3). On allocation of the start timing reference, the search may be performed based on the pre-determined coherent accumulation period. For example, if the pre-determined coherent accumulation period is selected to be 5 ms, then the search may be executed in the family of time slots spaced every 5 ms apart and so on and so forth, until the logical channel search is completed.

As explained above, the execution of the logical channel search on obtaining the start timing reference is based on the modulo count, which is based on the coherent accumulation period associated with the logical channel search. In an example embodiment, a number of logical channel searches are carried out in a parallel manner with different coherent accumulation periods, for example 5 ms, 11 ms and/or 19 ms. In such a scenario, a possibility arises wherein a number of logical channel searches may straddle or be scheduled at the same time. For example, the logical channel searches associated with coherent accumulation period of 5 ms and 11 ms may be scheduled at the same time slot of 55. In an example embodiment, the control sequencing block 326 is configured to perform scheduling of the order of logical channel searches in a manner such that a sum of maximum logical channel searches associated with different coherent accumulation period does not exceed a peak load capable of being handled by the correlator engine 320. For example, if the maximum load capable of being handled by the correlator engine 320 is 40 logical channel searches in 1 ms time period, then the sum of maximum of logical channel searches associated with each coherent accumulation periods in 1 ms time period is designed to not exceed 40 by the control sequencing block 326. Performing upfront coherent accumulation of the plurality of sample sets as explained in FIGS. 3 and 4, and scheduling logical channel searches as explained in FIGS. 5A and 5B optimizes searching/detection of the GNSS satellite signals and precludes the need to include an allotment of coherent memory for each logical channel search thereby enabling sizable saving in area and power consumption of the GNSS receiver 102.

Figure 6:
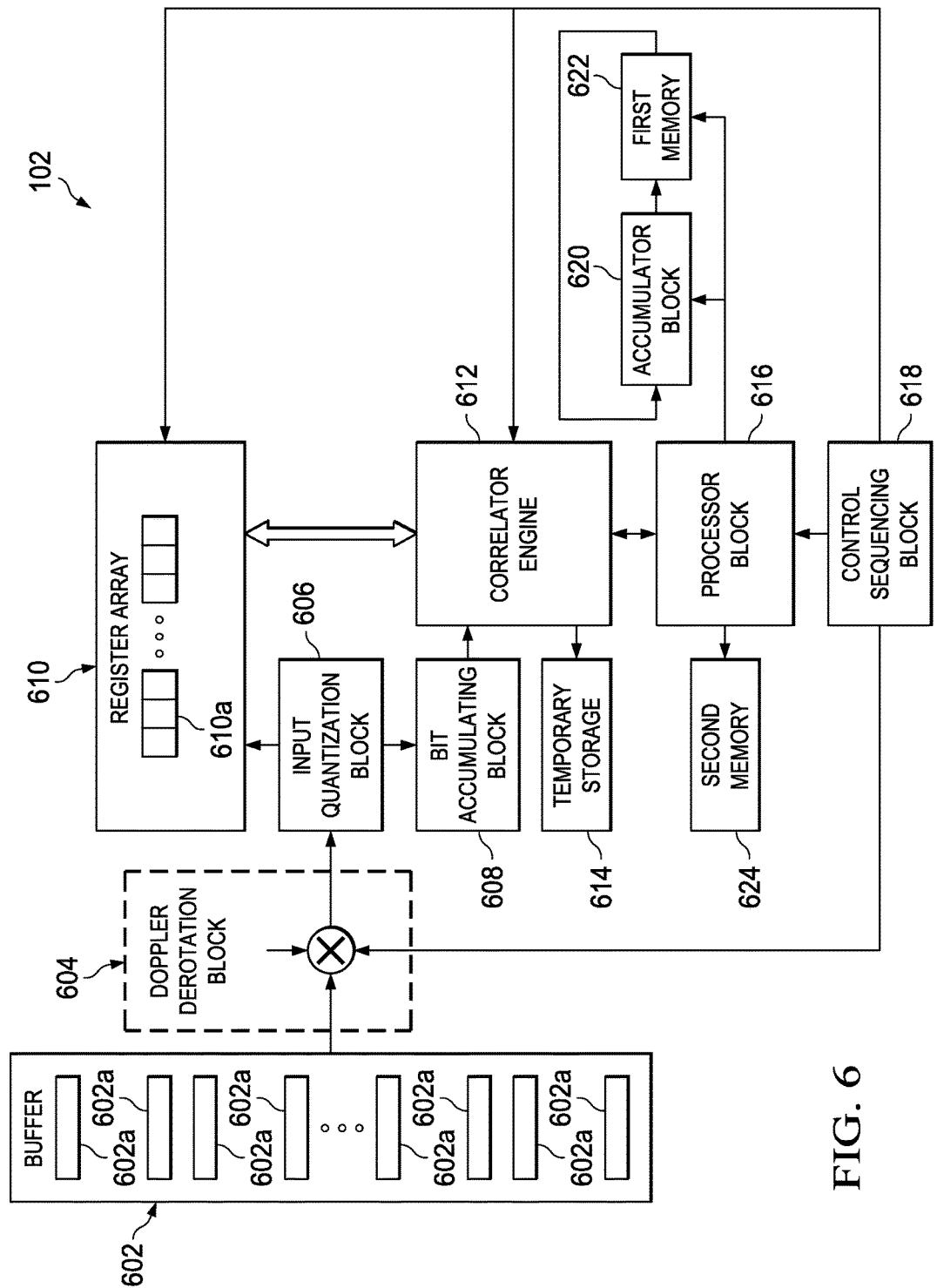
FIG. 6 is a block diagram illustrating a portion of a GNSS receiver configured to detect a presence of GNSS satellite signals in a received signal according to another embodiment.

FIG. 6 is a block diagram illustrating a portion of a GNSS receiver 102 configured to detect a presence of GNSS satellite signals in a received signal, according to another embodiment. More particularly, the GNSS receiver 102 of FIG. 6 includes a buffer 602, a Doppler derotation block 604, an input quantization block 606, a bit accumulating block 608, a register array 610, a correlator engine 612, a temporary storage 614, a processor block 616, a control sequencing block 618, a second memory 620, an accumulator block 622 and a first memory 624. The details of the portion of the GNSS receiver 102 are provided merely by way of illustration, and other embodiments may contain fewer or more components and corresponding interconnections.

The buffer 602 is configured to store a plurality of sample sets, such as sample set 602a corresponding to a received signal. The plurality of sample sets may be received from the quantization block, such as the quantization block 210 of FIG. 2. The sample sets 602a are similar to sample sets 302a of FIG. 3 and are not explained herein for sake of brevity. In an embodiment, the buffer 602 is a cyclical buffer. Accordingly, the buffer 602 may be configured to be cyclically loaded and store the sample sets based on a first in first out (FIFO) principal. More specifically, the latest sample set provided by quantization block may replace the earliest sample set stored in the buffer 602. In an embodiment, when a sample set is being loaded into the buffer 302, the remaining sample sets in the buffer 602 may be available for further processing. For example, if the 20$^{th}$ sample set is being loaded into the buffer 602, remaining 19 sample sets (sample sets 1 to 19) may be available for further processing. When the next 1 ms sample set is being loaded into the buffer 302, then sample sets 2 to 20 may be available for processing e.g., made available to be provided to the Doppler derotation block 604.

In an embodiment, the buffer 602 may be a ping-pong buffer. Accordingly, during loading of the sample sets in one section of the buffer (for example, ping section), the sample sets in the other section of the buffer (for example, the pong section) may be provided to the Doppler derotation block 604, which may be configured to perform a Doppler derotation corresponding to at least one Doppler frequency. Subsequently, the section loaded with sample sets may provide the sample sets to the Doppler derotation block 604 while the other section is being loaded with sample sets corresponding to the received signal.

The Doppler derotation block 604 is configured to receive the sample sets in an on-going manner from the buffer 602. The Doppler derotation block 604 may perform Doppler derotation similar to the Doppler derotation block 304 of FIG. 3. The Doppler derotation is not described herein. Upon or subsequent to performing the Doppler derotation of a sample set, the sample set may be provided to the input quantization block 606. The input quantization block 606 may perform a multiple level quantization of the results. The multiple level of quantization may associate each sample within the sample set with a sample bit representation. For example, the input quantization block 606 may be configured to perform a seven level quantization of the samples. The seven level of quantization may associate each sample with a three bit sample representation.

Subsequent to the quantization, the sample set is loaded in the register array 610. An example of the register array 610 may include, but is not limited to, a tapped delay line. In an example embodiment, the register array 610 includes locations, such as location 610a, configured to store samples corresponding to the sample set. The register array 610 is configured to be reloaded with subsequent sample set upon completion of correlation of the sample set loaded in the register array 610 with a plurality of code phases of a GNSS satellite.

The correlator engine 612 is configured to generate correlation results by correlating the samples corresponding to the sample set loaded in the register array 610 with a plurality of code phases of a GNSS satellite. More specifically, the correlator engine 612 may be configured to generate local signals corresponding to each transmitted GNSS signal and correlate the samples with each of the local signals to acquire (lock onto) and track (to maintain lock) the transmitted GNSS signals. Each local signal may be a corresponding PN code, generated for example by using a PN code generator (not shown), of a GNSS satellite. On correlating the samples stored in the register array 610, the local signal may be cyclically shifted, for example by one bit (e.g., code phase), until all bits of the local signal are shifted and the correlation with the samples stored in the register array 610 may be performed for each shifted version of the local signal.

In an example embodiment, the register array 610 is configured to be loaded with samples spanning one code period. In an example embodiment, 1023 samples (e.g., three bit representations of 1023 samples) corresponding to the results are loaded into the register array 610 after correcting for a Doppler frequency, for example first Doppler frequency. During the process of loading the samples in the register array 610, the correlator engine 612 may also generate a local signal which is a PN code corresponding to the GNSS satellite. In an example embodiment, the correlator engine 612 is configured to facilitate a search of GNSS satellite signals in the received signal by correlating results loaded in the register array 610 with a plurality of code phases of GNSS satellites. The correlator engine 612 may correlate the samples with the local signal, e.g., multiply the samples within the results with +1/−1 values corresponding to the PN code, to generate a set of correlation results. In an embodiment, the correlation may be performed based on cyclic convolution as explained in FIG. 3. The correlation results may be stored in the temporary storage 614. The correlation results stored in the temporary storage 614 may be processed and the temporary storage 614 may be emptied subsequently.

The correlation results may be generated similarly for multiple Doppler frequencies for a plurality of code phases for each GNSS satellite being searched and stored in the temporary storage 614, which may be emptied for storing next set of correlation results. It is noted that the plurality of code phases is configured by cyclically shifting a GNSS satellite code corresponding to the GNSS satellite by at least one code phase. It should be appreciated that for samples at 2 spc, after computing all the correlations of odd samples, the 1023 input samples corresponding to the even samples may be loaded and correlations may be computed and stored in the temporary storage 614.

In an example embodiment, the bit accumulating block 608 is configured to accumulate a bit at the first position within each sample representation corresponding to the samples in the results while loading the results in the register array 610. It may be appreciated that each sample loaded in the register array 610 is represented by its entire sample bit representation (including the bit at the first position) and that the bit accumulating block 608 may be configured to record the bit at the first position for each sample. In an example embodiment, the first position corresponds to a least significant bit (LSB) position within each sample bit representation and the bit accumulating block 608 stores and accumulates the LSB bits of the sample bit representations while loading the results in the register array 610. The correlator engine 612 is configured to perform partial correlation of the samples by correlating remaining bits, e.g., bits not at the LSB position or the most significant bits, with the plurality of code phases of the GNSS satellite. The accumulated LSB bits may be added to the partial correlation results for generating the correlation results.

In an example embodiment, for a 2 spc sampling rate, correlation results for the even samples (0, 2, 4, 6, . . . ) are stored in the temporary storage 614 followed by the storage of the correlation results for the odd samples (1, 3, 5 . . . ). The correlation results may then be arranged in a natural order (0, 1, 2, 3 . . . ) and stored in the temporary storage 614. The correlation results corresponding to a sample set may be provided by the processor block 616 from the temporary storage 614 to the accumulator block 620 which may store the correlation results in the first memory 622. Upon generation of the correlation results for the subsequent sample set, the correlation results may be provided by the processor block 616 to the accumulator block 620 which may coherently add the correlation results corresponding to the sample set stored in the first memory 622 with the correlation results corresponding to the subsequent sample set. The accumulator block 620 may be configured to coherently accumulate (e.g., coherently add) correlation results corresponding to a plurality of sample sets based on a pre-determined coherent accumulation period. In an embodiment, the correlation results corresponding to the same logical channel search may be coherently accumulated by the accumulator block 620 and stored in the first memory 622. In an embodiment, the coherent accumulation of the correlation results corresponding to the plurality of sample sets may be performed in a manner similar to the coherent accumulation of the plurality of sample sets explained in FIG. 4.

In an example embodiment, the pre-determined coherent accumulation period is one of a 1 ms, 5 ms, 11 ms, 19 ms time period. Further, it is noted that the 1 ms, 5 ms, 11 ms, 19 ms time period rates are provided for exemplary purposes only and do not limit the scope of the present disclosure. Also, the pre-determined coherent accumulation period may include time period other than 1 ms, 5 ms, 11 ms, 19 ms time period. The coherent accumulation of the Doppler derotated plurality of sample sets may include summing the sample sets based on the pre-determined coherent accumulation period. The coherent accumulation may also include integrating I and Q components of the received signal separately.

In an embodiment, the processor block 616 is configured to perform a non-coherent accumulation of the correlation results. The second memory 624 is configured to store the non-coherent accumulation of the correlation results. The processor block 616 is further configured to perform a timing offset correction on the correlation results prior to performing the non-coherent accumulation of the correlation results. Procedures for the timing offset correction may include but are not limited to procedures such as code Doppler correction, and are not discussed herein.

The second memory 624 is configured to store the non-coherent accumulation of the correlation results. It is noted that the second memory 624 may include a bank of non-coherent memories for the non-coherent accumulation of the correlation results. The non-coherent accumulation of the correlation results may be performed to improve a signal-to-noise ratio (SNR) of the received signal configured to detect the presence of the GNSS satellite signals in the received signal. The non-coherent accumulation may include techniques, such as accumulating absolute values of accumulated data from the coherent accumulation, accumulating squares of absolute values of accumulated data from the coherent accumulation and the like. It is noted that that the first memory 622 is a temporary memory capable of storing coherent accumulation outputs of one search, where as the second memory 624 is configured to store non coherent outputs of all the searches in progress.

In an example embodiment, the processor block 616 is further configured to detect the presence of the at least one GNSS satellite signal based on the coherent and the non-coherent accumulation of the correlation results. For example, the correlation results corresponding to each code phase search in 1 ms may be summed over 1 s (or such other programmed time duration) to identify a clear peak (for example by checking for crossing of pre-defined mathematical threshold functions and the like), which may signify the presence of GNSS satellite signal. The location of the peak may then be obtained by interpolation, and such known procedures, for obtaining a distance between a GNSS satellite and the user.

The control sequencing block 618 is configured to trigger/control a sequence of operations, for example, scheduling an order of searching for the plurality of GNSS satellites, selecting the Doppler frequency configured to perform a Doppler derotation, e.g., carrier Doppler removal, determining coherent accumulation period for generating the results, loading the sample set into the register array 610 and selecting the GNSS satellite code for performing the correlation operation.

The portion of the GNSS receiver 102 depicted in FIG. 6 is depicted to perform coherent accumulation of the correlation results and precludes the need to include an allotment of coherent memory for each logical channel search thereby enabling sizable saving in area and power consumption of the GNSS receiver 102.

It should be noted that some of the features described in this specification have been presented as blocks (e.g., the Doppler derotation block 604 of FIG. 6 or the processor block 324 of FIG. 3), in order to more particularly emphasize their implementation independence. A block may be implemented as a hardware circuit comprising custom very large scale integration or integrated (VLSI) circuits or circuitry, gate arrays, off-the-shelf semiconductors such as logic chips, transistors, or other discrete components. A block may also be implemented in programmable hardware devices, such as field programmable gate arrays, programmable array logic, programmable logic devices, graphics processing units, and the like.

A block may also be at least partially implemented in software for execution by various types of correlator engines. An identified block of executable code may, for instance, comprise one or more physical or logical blocks of computer instructions, which may, for instance, be organized as an object, procedure, or function. Nevertheless, the executables of an identified block need not be physically located together, but may comprise disparate instructions stored in different locations which, when joined logically together, comprise the module and achieve the stated purpose for the module. Further, blocks may be stored on a computer-readable medium, which may be, for instance, a hard disk drive, flash device, random access memory (RAM), tape, or any other such medium used to store data. Moreover, components, such as the buffer 302, the first memory 308, the temporary storage 322 and the second memory 328 of FIG. 3 and the buffer 602, temporary storage 614, first memory 622 and the second memory 624 may be implemented as storage components, for example, random access memory (RAM), flash memory, etc.

The flowchart diagram that follows is generally set forth as logical flowchart diagram. The depicted operations and sequences thereof are indicative of at least one embodiment. It is noted, however, that the scope of the present disclosure includes methods that use other operations and sequences, and methods that are useful or similar in function, logic, or effect. Also, while various arrow types, line types, and formatting styles may be employed in the flowchart diagrams, they are understood not to limit the scope of the corresponding method(s). In addition, some arrows, connectors and other formatting features may be used to indicate the logical flow of the methods. For instance, some arrows or connectors may indicate a waiting or monitoring period of an unspecified duration. Accordingly, the specifically disclosed operations, sequences, and formats are provided to explain the logical flow of the methods and are understood not to limit the scope of the present disclosure.

Figure 7:
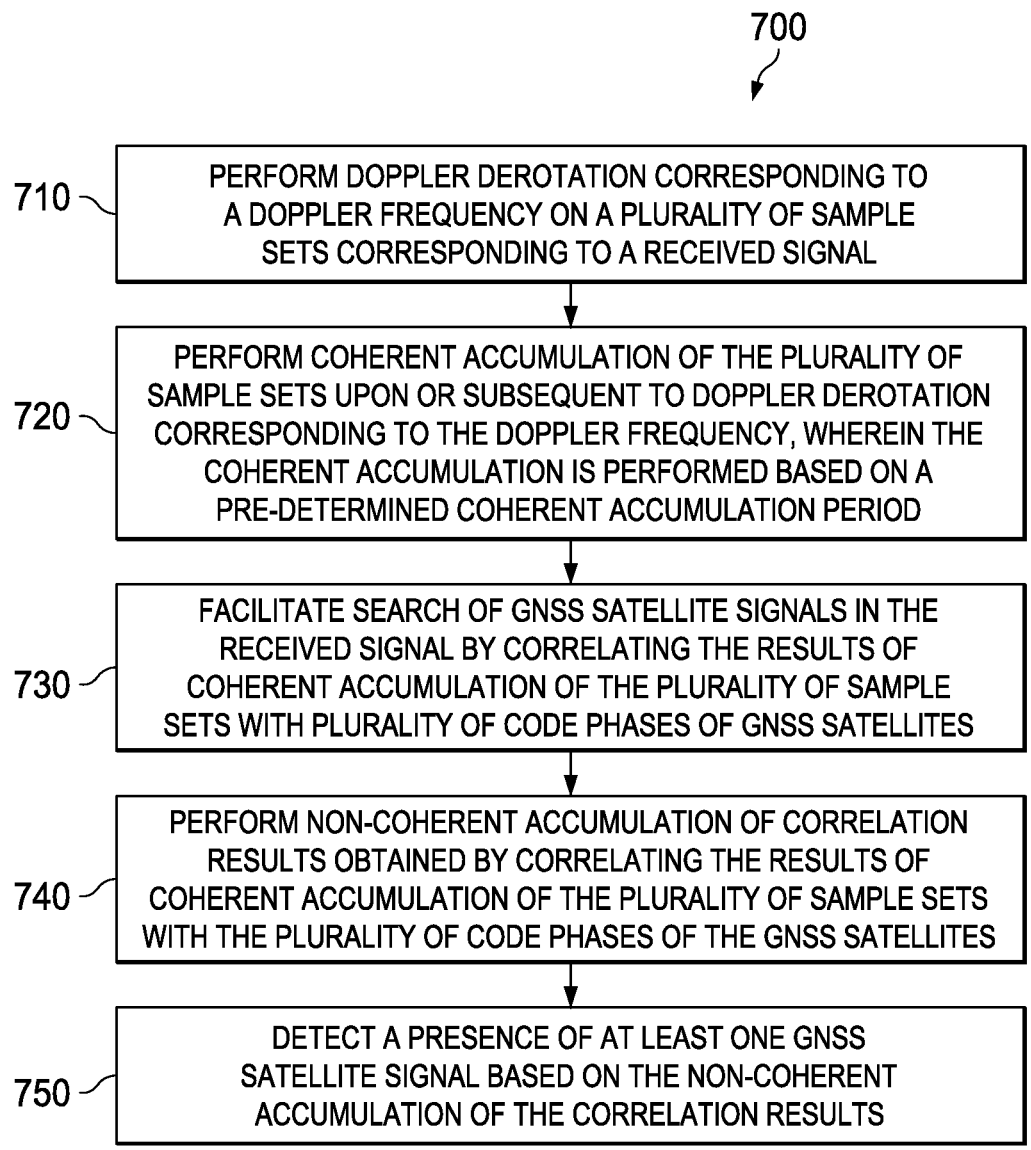
FIG. 7 is a flowchart diagram of a method for detecting satellite signals in a received signal according to an embodiment.

FIG. 7 is a flowchart diagram of a method 700 configured to detect a presence of GNSS satellite signals in a received signal, according to an embodiment. The method 700 depicted in flow chart may be executed by, for example, the GNSS receiver 102, explained in FIG. 3. The method 700 includes performing 710 Doppler derotation corresponding to a Doppler frequency on a plurality of sample sets corresponding to a received signal (e.g., using the Doppler derotation block 304), performing 720 coherent accumulation of the plurality of sample sets upon or subsequent to Doppler derotation corresponding to the Doppler frequency (e.g., using the accumulator block 306), facilitating 730 search of GNSS satellite signals in the received signal by correlating the results of coherent accumulation of the plurality of sample sets with plurality of code phases of GNSS satellites (e.g., using the correlator engine 320), performing 740 non-coherent accumulation of correlation results obtained by correlating the results of coherent accumulation of the plurality of sample sets with a plurality of code phases of the GNSS satellites (e.g., using the second memory 328), and detecting 750 a presence of at least one GNSS satellite signal based on the non-coherent accumulation of the correlation results (e.g., using the processor block 324).

As explained in FIG. 1, the received signal may contain multiple transmitted GNSS signals, such as the satellite signals 104a, 104b, 104c and 104d. The received signal may be down-converted to an intermediate frequency (e.g., using the front-end processing block 204), converted to the plurality of digital samples (e.g., using the ADC 206) and down-converted to baseband frequency (e.g., using the decimation and filtering block 208) and quantized to generate sample sets corresponding to the signal (e.g., using the quantization block 210) prior to storing the sample sets (e.g., using the buffer 302).

As explained in FIG. 3, due to reasons such as relative motion of the GNSS satellites and the user or a receiver clock offset, there may be a Doppler shift in the frequency "f" of the received signal. Several such estimates of the Doppler frequency (e.g., Doppler shift in the frequency) may be considered. In an example embodiment, negative Doppler coefficients or negative Doppler frequency may be generated corresponding to each Doppler frequency and the plurality of sample sets may be multiplied by the negative Doppler frequency to perform the Doppler derotation and remove the impact of the carrier Doppler shift in the signal.

In an example embodiment, the coherent accumulation is performed based on a pre-determined coherent accumulation period. The coherent accumulation of the plurality of sample sets may be performed as explained in FIG. 4. In an embodiment, the pre-determined coherent accumulation period for performing the coherent accumulation of the plurality of sample sets is one of 1 ms, 5 ms, 11 ms and 19 ms time period. In an example embodiment, upon coherent accumulation of the plurality of sample sets upon or subsequent to Doppler derotation corresponding to the Doppler frequency, the results of the coherent accumulation are stored (e.g., using the first memory 308) prior to correlating the results with a plurality of code phases of GNSS satellites.

In an example embodiment, the start timing reference is allocated for each search for a GNSS satellite signal based on a load status associated with the number of searches for GNSS satellite signals in the received signal. In an example embodiment, the start timing reference is allocated for each search for a GNSS satellite signal based on a least load status associated with the number of searches for GNSS satellite signals in the received signal. In an embodiment, upon allocation of the start timing reference, the execution of the search for a GNSS satellite signal is performed based on a modulo count and pre-determined coherent accumulation period associated with the search as explained in FIGS. 5A and 5B.

In an embodiment, the non-coherent accumulation of the correlation results may be performed to improve a signal-to-noise ratio (SNR) of the received signal and may include techniques, such as accumulating absolute values of accumulated data from the coherent accumulation, accumulating squares of absolute vales of accumulated data from the coherent accumulation and the like.

In an example embodiment, the correlation results corresponding to each code phase search in 1 ms may be summed over 1 s (or such other programmed time duration) to identify a clear peak (for example by checking for crossing of pre-defined mathematical threshold functions and the like), which may signify the presence of GNSS satellite signal. The location of the peak may then be obtained by interpolation, and such known procedures, for obtaining a distance between from a GNSS satellite. Another method configured to detect a presence of GNSS satellite signals in a received signal is explained in FIG. 8.

Figure 8:
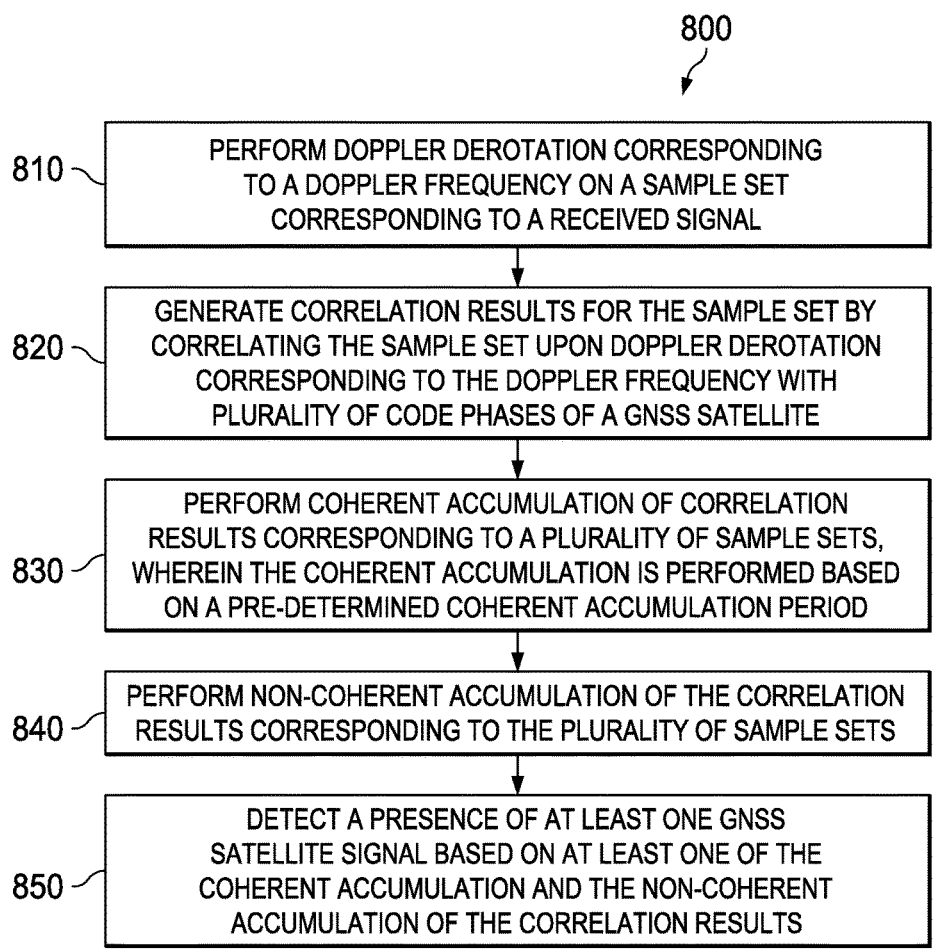
FIG. 8 is a flowchart diagram of a method for detecting satellite signals in a received signal according to another embodiment.

FIG. 8 is a flowchart diagram of a method 800 for detecting presence of GNSS satellite signals in a received signal, according to another embodiment. The method 800 depicted in flow chart may be executed by, for example, the GNSS receiver 102, explained in FIG. 6. The method 800 includes performing 810 Doppler derotation corresponding to a Doppler frequency on a sample set corresponding to a received signal (e.g., using the Doppler derotation block 604), generating 820 correlation results for the sample set by correlating the sample set upon or subsequent to Doppler derotation corresponding to the Doppler frequency with a plurality of code phases of a GNSS satellite (e.g., using the correlator engine 612), performing 830 coherent accumulation of correlation results corresponding to a plurality of sample sets (e.g., using the correlator engine 612), performing 840 non-coherent accumulation of the correlation results corresponding to the plurality of sample sets (e.g., using the processor block 616) and detecting 850 a presence of at least one GNSS satellite signal based on at least one of the coherent accumulation and the non-coherent accumulation of the correlation results (e.g., using the processor block 616).

The Doppler derotation of a sample set, generation of the correlation results for the sample set, coherent accumulation of correlation results corresponding to a plurality of sample sets, non-coherent accumulation of the correlation results and detection of the presence of at least one GNSS satellite signal based on at least one of the coherent accumulation and the non-coherent accumulation of the correlation results may be performed as explained in FIG. 6 and is not explained herein.

In an example embodiment, upon coherent accumulation of the plurality of the correlation results corresponding to the plurality of sample sets, the results of the coherent accumulation are stored (e.g., using the first memory 622). In an example embodiment, the coherent accumulation is performed based on a pre-determined coherent accumulation period. In an embodiment, the pre-determined coherent accumulation period for performing the coherent accumulation of the plurality of sample sets is one of 1 ms, 5 ms, 11 ms and 19 ms time period.

As described above, the systems, devices (e.g., apparatuses) and methods of the present disclosure include multiple solutions configured to detect a presence of the satellite signals in a received signal by a GNSS receiver, such as the GNSS receiver 102. It is noted, therefore, that the present disclosure discloses several features that enable the GNSS receiver to be implemented with smaller area and power consumption. For example, performing upfront coherent accumulation of the sample sets (as explained in FIG. 3) or coherent accumulation of the correlation results corresponding to the sample sets (as explained in FIG. 6) precludes the need to include a separate coherent memory allocation (For example, Pred memory allocation of memory 218 of FIG. 2) for each logical channel search leading to sizable saving in area and power consumption of the GNSS receiver. Further, the scheduling of the logical channel searches as explained in FIGS. 5A and 5B for upfront mode provide a simple and efficient technique for optimizing the processing load of a correlator engine, such as the correlator engine 320.

It should be noted that reference throughout this specification to features, advantages, or similar language does not imply that all of the features and advantages should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Further, the described features, advantages, and characteristics of the disclosure may be combined in any suitable manner in one or more embodiments. One skilled in the relevant art will recognize that the disclosure can be practiced without one or more of the specific features or advantages of a particular embodiment. In other instances, additional features and advantages may be recognized in certain embodiments that may not be present in all embodiments of the disclosure.

One having ordinary skill in the art will understand that the present disclosure, as discussed above, may be practiced with steps and/or operations in a different order, and/or with hardware elements in configurations, which are different than those which, are disclosed. Therefore, although the disclosure has been described based upon these preferred embodiments, it is noted that certain modifications, variations, and alternative constructions are apparent and well within the spirit and scope of the disclosure. In order to determine the metes and bounds of the disclosure, therefore, reference should be made to the appended claims.

What is claimed is:

1. A process of detecting coded signals from satellites in integrated circuitry, each satellite repeatedly transmitting a unique, analog, coded signal of a certain code period, comprising:
 (a) receiving in the integrated circuitry the analog, coded signals from the satellites;
 (b) converting the analog, coded signals to coded digital signals in analog to digital converter circuitry;

(c) generating quantized samples of the coded digital signals in first quantization circuitry;

(d) storing the quantized samples in a buffer, the storing including storing sample sets with each set including a number of samples of the coded digital signals spanning a code period;

(e) performing a Doppler derotation on a sample set in the buffer in Doppler derotation circuitry;

(f) coherently accumulating Doppler derotated sample sets in accumulator circuitry for a selected coherent accumulation period;

(g) generating a multiple level quantization of the results of the coherently accumulated Doppler derotated sample sets for a coherent accumulation period in second quantization circuitry, including associating each sample within the sample set with a sample bit representation;

(h) loading results of the multiple level quantization to a register array;

(i) correlating with correlation circuitry the results of the multiple level quantization in the register array with plural code phases of the satellite signals;

(j) non-coherently accumulating the correlations in memory; and (k) searching for the coded digital signals corresponding to one satellite based on the selected coherent accumulation period and a start timing reference.

2. The process of claim 1 in which the certain period is 1 millisecond and a satellite transmits analog, coded signals that include a data bit every 20 milliseconds by modulating every 20 consecutive coded signals.

3. The process of claim 1 including computing a position of the integrated circuitry after detecting the presence of coded signals from four satellites.

4. The process of claim 1 including generating 1023 samples in one set of the coded digital signals.

5. The process of claim 1 including generating 1023×6 bits in one sample set of the coded digital signals, with 3 bits representing an I value, and 3 bits representing a Q value.

6. The process of claim 1 in which the storing includes storing samples at one sample per chip.

7. The process of claim 1 in which the storing includes storing samples at two samples per chip.

8. The process of claim 1 in which the storing includes storing samples at four samples per chip.

9. The process of claim 1 in which the selected coherent accumulation period is one of 5 milliseconds, 11 milliseconds, or 19 milliseconds.

10. The process of claim 1 in which the selected accumulation period is less than 20 milliseconds.

11. An integrated circuit comprising:
receiver circuitry having an input receiving a unique, analog, coded signal of a certain code period transmitted from each of several satellites and having an analog, coded signal output;
analog to digital converter circuitry having an input coupled to analog, coded signal output and having a digital, coded signal output;
first quantization circuitry having an input coupled to the digital, coded signal output and having a quantized digital, coded signal output;
buffer circuitry having an input coupled to the quantized digital, coded signal output, the buffer circuitry being large enough to store sample sets of the quantized digital, coded signals received at the input with each set including a number of samples of the quantized digital, coded signals spanning a code period, and the buffer circuitry having a buffer output;

Doppler derotation circuitry having an input coupled to the buffer output and having a derotation output providing Doppler derotated sample sets of the quantized digital, coded signals;

accumulator circuitry having an input coupled to the derotation output, having an accumulator output providing coherently accumulated Doppler derotated sample sets for a selected coherent accumulation period, and having an accumulator output;

second quantization circuitry having an input coupled to the accumulator output and having a second quantization output, the second quantization circuitry performing a multiple level quantization of the results of the accumulator circuitry;

a register array having an input coupled to the second quantization output to store the results of the second quantization, and having a register output;

correlation circuitry having an input coupled to the register output and having a correlation output, the correlation circuitry correlating the results of the second quantization in the register array with plural code phases of the satellite signals;

memory circuitry having an input coupled to the correlation output and storing the correlation results; and a control sequencing circuitry coupled to the correlation circuitry and the Doppler derotation circuitry, and scheduling a sequence of searches for the satellite signals based on the selected coherent accumulation period and a start timing reference.

12. The integrated circuit of claim 11 in which the certain period is 1 millisecond and a satellite transmits analog coded signals that include a data bit every 20 milliseconds by modulating every 20 consecutive coded signals.

13. The integrated circuit of claim 11 including processing circuitry computing a position of the integrated circuitry after detecting the presence of coded signals from four satellites.

14. The integrated circuit of claim 11 in which the quantization circuitry generates 1023 samples in one set of the coded digital signals.

15. The integrated circuit of claim 11 in which the quantization circuitry generates 1023×6 bits in one sample set of the coded digital signals, with 3 bits representing an I value, and 3 bits representing a Q value.

16. The integrated circuit of claim 11 in which the buffer circuitry stores samples at one sample per chip.

17. The integrated circuit of claim 11 in which the buffer circuitry stores samples at two samples per chip.

18. The integrated circuit of claim 11 in which the buffer stores samples at four samples per chip.

19. The integrated circuit of claim 11 in which the selected coherent accumulation period is one of 5 milliseconds, 11 milliseconds, or 19 milliseconds.

20. The integrated circuit of claim 11 in which the selected accumulation period is less than 20 milliseconds.

21. The process of claim 1 in which the generating a multiple level quantization performs a seven level quantization of the samples that associates each sample with a three bit sample representation.

22. The integrated circuit of claim 11 in which the second quantization circuitry associates each sample within the sample set with a sample bit representation to perform a seven level quantization of the samples associating each sample with a three bit sample representation.

\* \* \* \* \*